(12) United States Patent
Leone et al.

(10) Patent No.: US 7,618,021 B2
(45) Date of Patent: Nov. 17, 2009

(54) RATCHET CAP FOR WINCH

(75) Inventors: Thomas H. Leone, Burlington, KY (US); Howard Thomas Knox, Hebron, KY (US)

(73) Assignee: Ancra International, LLC., Hawthorne, CA (US)

( * ) Notice: Subject to any disclaimer, the term of this patent is extended or adjusted under 35 U.S.C. 154(b) by 520 days.

(21) Appl. No.: 11/412,039

(22) Filed: Apr. 26, 2006

(65) Prior Publication Data

US 2007/0267611 A1 Nov. 22, 2007

(51) Int. Cl.
*B21F 9/00* (2006.01)

(52) U.S. Cl. .................... 254/223; 254/238; 24/69 CT; 410/100; 410/103

(58) Field of Classification Search .................. 254/222, 254/223, 237, 238; 24/70 ST, 69 ST, 69 CT; 410/100, 103
See application file for complete search history.

(56) References Cited

U.S. PATENT DOCUMENTS

| | | | | |
|---|---|---|---|---|
| 6,135,685 | A * | 10/2000 | Anthony et al. | 410/100 |
| 6,558,092 | B1 * | 5/2003 | Woodruff | 410/12 |
| 6,960,053 | B2 * | 11/2005 | Woodruff | 410/12 |
| 7,410,334 | B2 * | 8/2008 | McGrew | 410/100 |
| 7,413,170 | B2 * | 8/2008 | Ruan | 254/244 |
| 2004/0013490 | A1 * | 1/2004 | Cauchon | 410/103 |
| 2007/0114504 | A1 * | 5/2007 | Ruan | 254/223 |

\* cited by examiner

*Primary Examiner*—Emmanuel M Marcelo
(74) *Attorney, Agent, or Firm*—Edward A. Sokolski; Don B. Finkelstein

(57) ABSTRACT

A winch used for tightening a strap to retain an article, which may be cargo, on the deck of a vehicle has a ratcheting mechanism which tightens the strap around a cylindrical shaft. A ratchet cap installed on the winch has two sections. One of these sections is fixedly attached to the winch drive shaft. This first section has a plurality of spaced recesses running around a surface plate thereof. Spring urged pins with rounded end surfaces are mounted in receptacles formed in the second cap section. The rounded ends of the spring urged pins are urged against the surfaces of the recesses. The pins are prevented from moving out of the recesses in one direction by a right angled end portion of the recess in this one direction and are free to move out of a recess over a slanted recess end portion into an adjoining recess in the opposite direction. At least one aperture is formed in the cap into which a lever for driving the winch is fitted. When the lever hits against the deck and cannot be moved any further, the ratchet cap can be rotated in its free moving direction to enable further driving of the winch downwardly to tighten the strap.

10 Claims, 4 Drawing Sheets

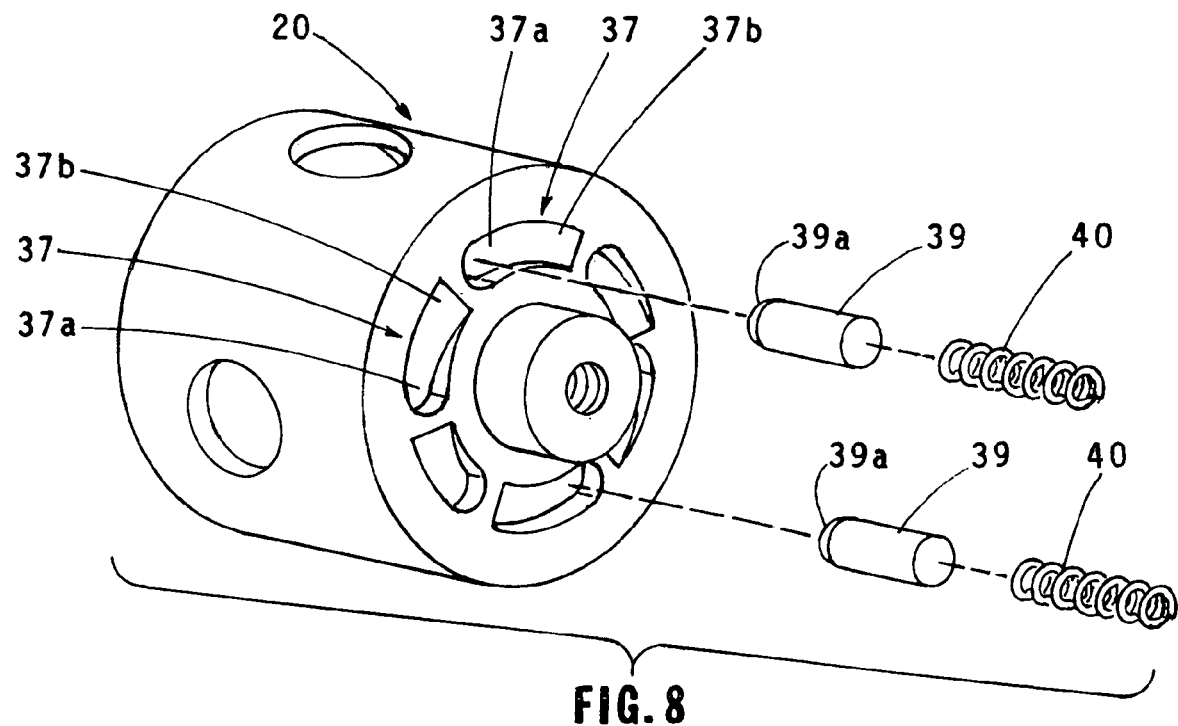
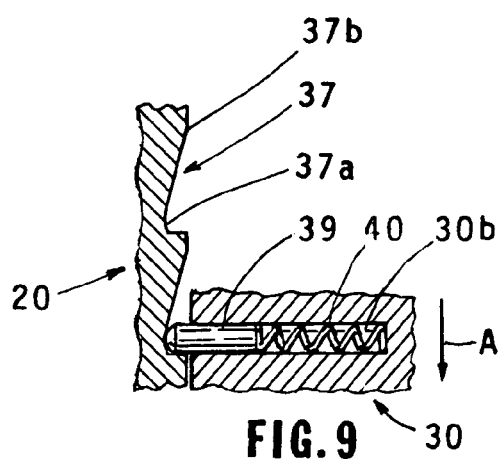
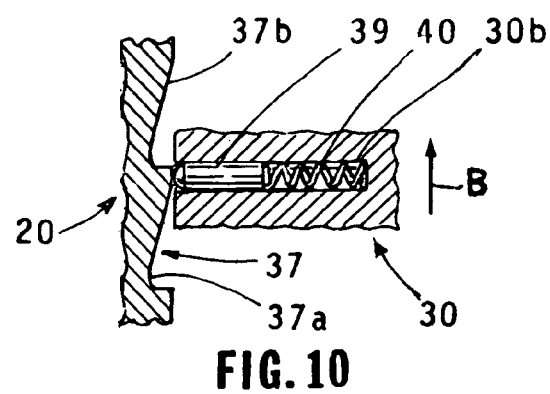

RATCHET CAP FOR WINCH

BACKGROUND OF THE INVENTION

This invention relates to a ratchet cap for installation on a winch used for securing a strap which retains an article on a floor (typically the floor of a vehicle). The ratchet cap enables driving of the winch with a lever in a single position relative to the winch without the need for removing the lever and placing it in another drive position when it reaches the limit of its rotation.

Description of the Related Art

A typical prior art winch for securing a strap which retains an article, which may be cargo, on the deck of a vehicle is illustrated in FIG. 1. This prior art winch has a ratchet wheel 11 which is driven in one direction by drive shaft 12 which tightens strap 13 around the shaft. The ratchet wheel 11 only permits rotational movement in the tightening direction and prevents movement in the opposite direction unless manually released.

The drive shaft 12 of this prior art device has apertures 14 formed therein, ninety degree from each other. A lever 16 removably fits into apertures 14 and is used to rotatably drive shaft 12. As can be seen, however, in FIG. 1, in dotted form, after the lever has been driven approximately a quarter of a turn, it reaches the limit of its rotation. To further drive the drive shaft, the lever must be removed from the first aperture and placed into a second aperture spaced ninety degrees back from the first aperture. This slows down the operation significantly, particularly where there are a large number of winches to be tightened down.

SUMMARY OF THE INVENTION

The device of the present invention employs a ratcheting cap which is attached to the drive shaft of the winch. Such attachment can be made to prior art winches without any modification thereto and enables driving of the drive shaft without the need to remove the drive lever from an aperture in which is installed and reinstalling it in another aperture. The ratcheting cap has a first section which is securely installed on the drive shaft. A second section of the cap has a pair of oppositely positioned spring urged pin members having rounded end portions. These end portions fit into recesses formed in an opposing plate in the first cap section. There are a plurality of such recesses which run all around the plate. One end of each recess runs substantially at right angles to the surface of the plate so as to prevent the rounded end portions of the pins from moving out of a recess when driven against this end. The other end of each recess has a slanted configuration relative to the surface of the ratchet plate so as to permit the rounded end portions of the pins to run out of their associated recess into the adjoining recess when the ratcheting cap is turned manually. The drive for the winch thus can be moved backwardly without lessening the tension on the strap when it reaches a down position against the deck, thereby permitting additional tightening of the strap around the winch without removing the drive lever.

DESCRIPTION OF THE DRAWINGS

FIG. 8 is a side exploded view illustrating the attachment of the spring urged pin members in the preferred embodiment of the invention; and FIGS. 9 and 10 are cross sectional views indicating the operation of the spring urged pin members in the preferred embodiment of the invention.

DETAILED DESCRIPTION OF THE INVENTION

Figure 1:
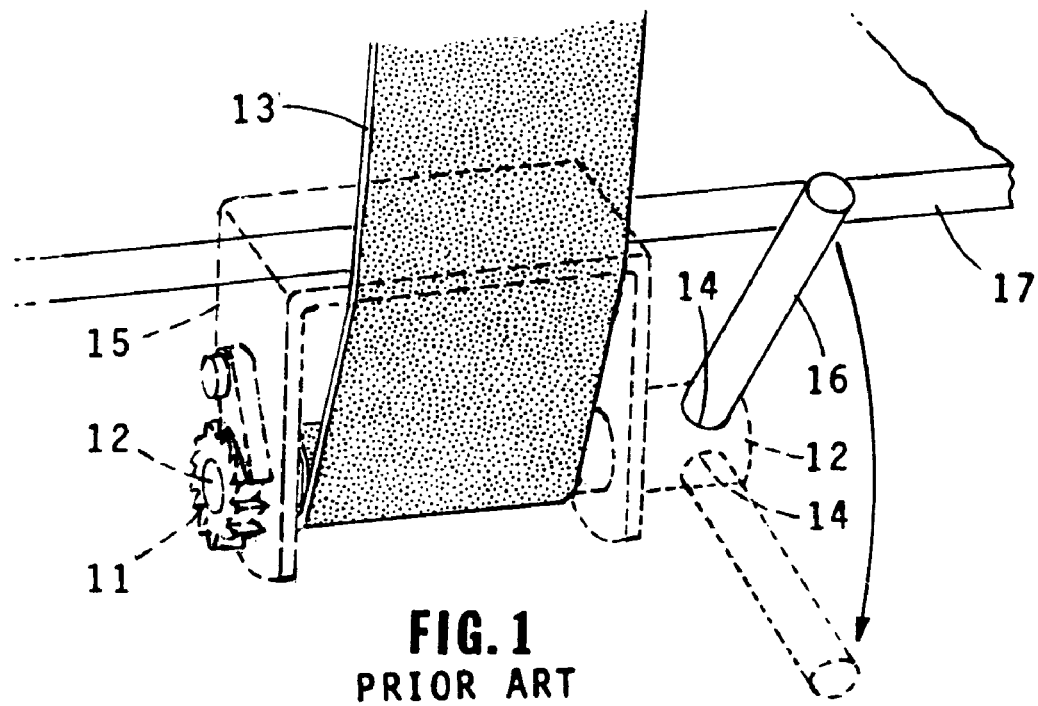
FIG. 1 is a top side perspective view of a prior art winch to which the device of the invention can be added.
Figure 2:
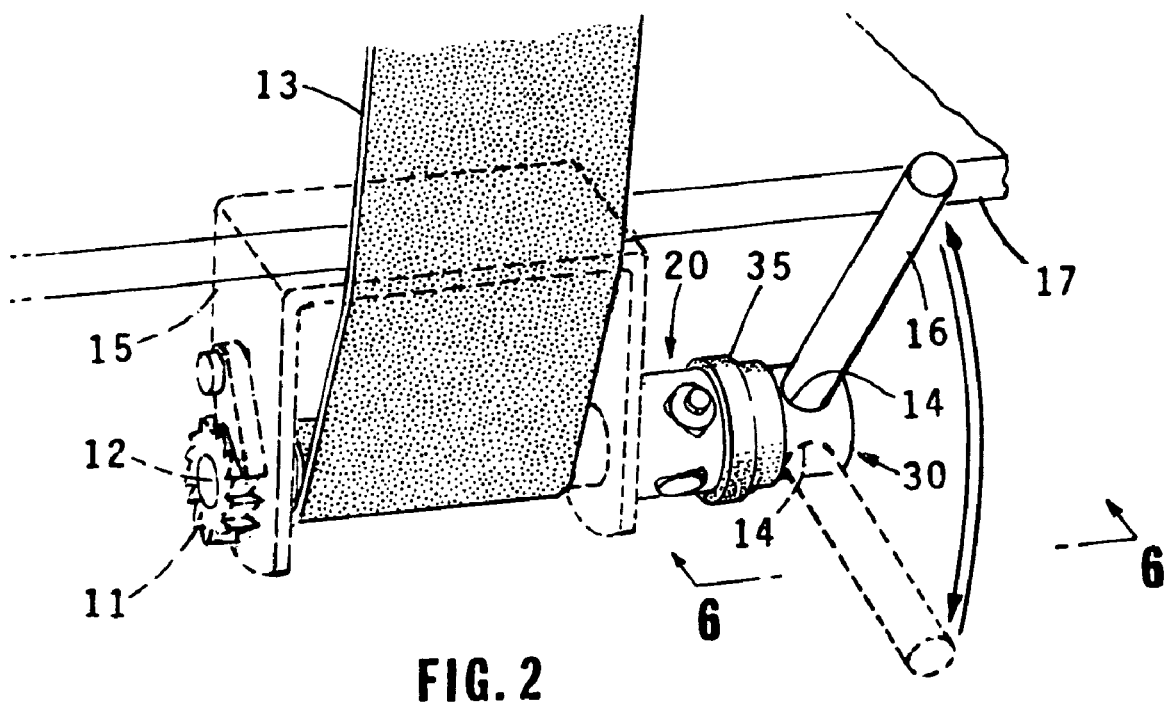
FIG. 2 is a top side perspective view illustrating a preferred embodiment of the present invention installed on the prior art winch shown in FIG. 1.
Figure 3:
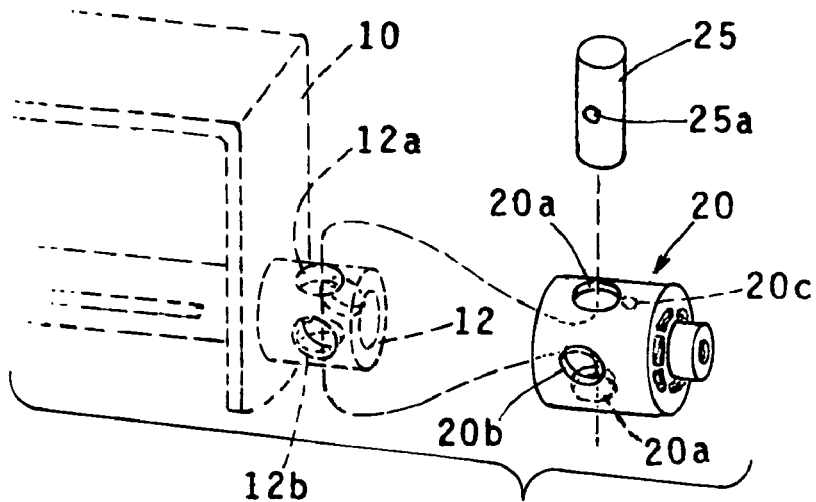
FIG. 3 is a top side exploded view illustrating the attachment of the cap assembly of the preferred embodiment to a prior art winch.

Referring to FIG. 2, a first section 20 of the ratcheting cap is fixedly attached to the drive shaft 12. A second ratcheting cap section 30 is connected to first cap section 20 for rotatable motion relative thereto in one direction but not in the opposite direction. Thus, the second cap section can be rotatably moved backward away from the floor to permit the lever arm 16 to be drawn upwardly away from the floor, as shown in FIG. 2. This does not release the ratchet 11 but raises the lever arm so that it can then be driven downwardly to tighten the ratchet and along with it strap 13.

Figure 4:
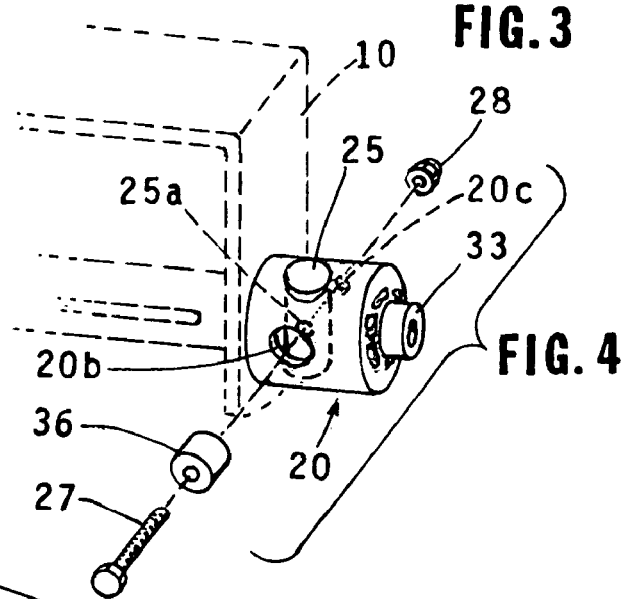
FIG. 4 is a top side exploded view illustrating details of the attachment of the attachment of the cap assembly of the preferred embodiment to a prior art winch.
Figure 5:
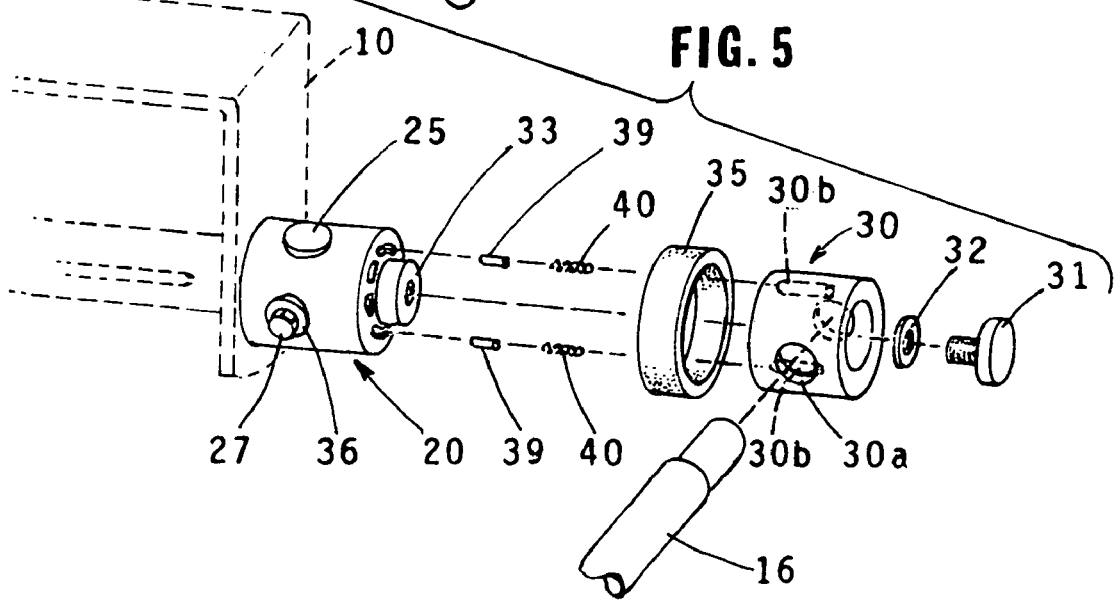
FIG. 5 is a top side exploded view showing the attachment of all of the component of cap assembly of the preferred embodiment to a prior art winch.
Figure 6:
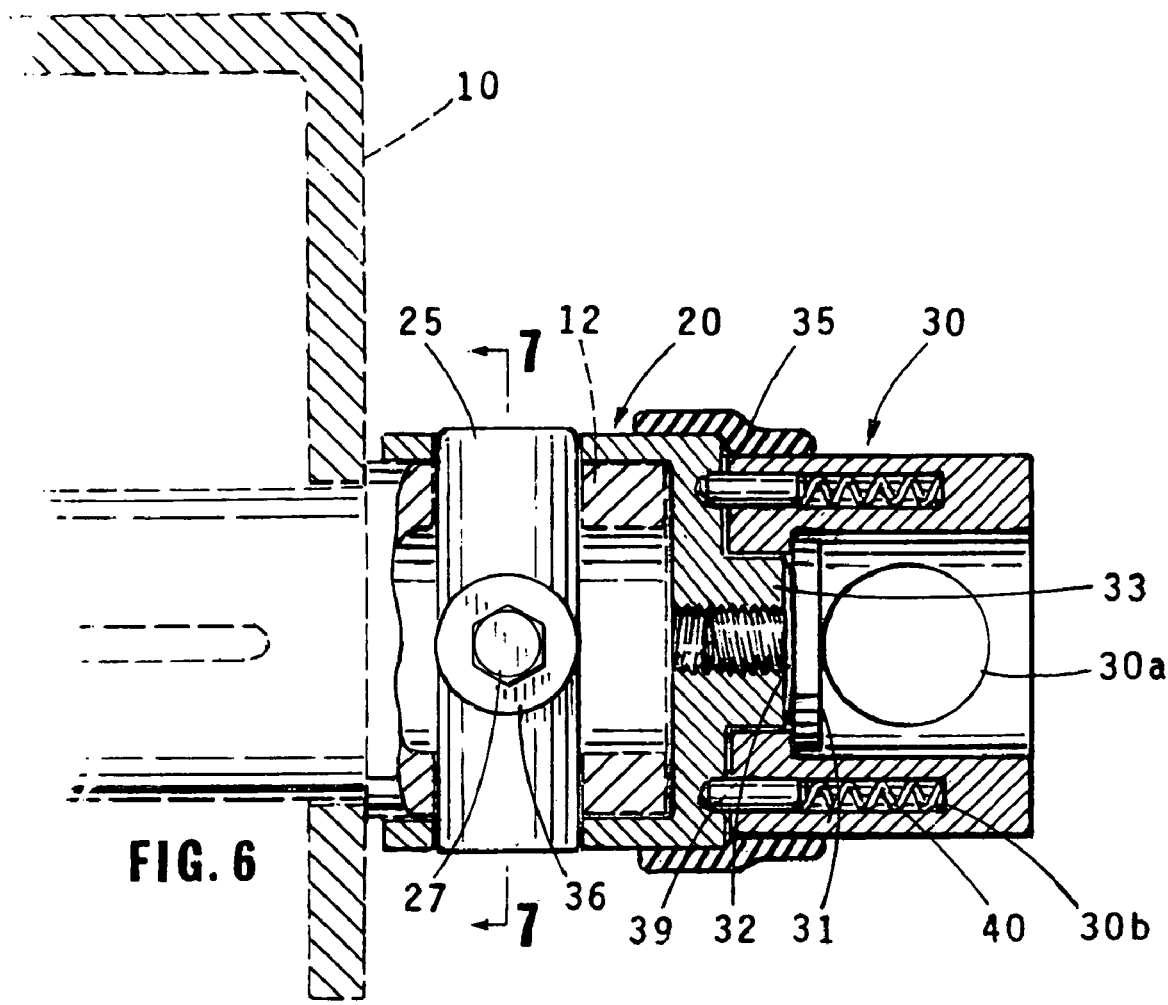
FIG. 6 is a cross sectional view taken along the plane indicated by 6-6 in FIG. 2.
Figure 7:
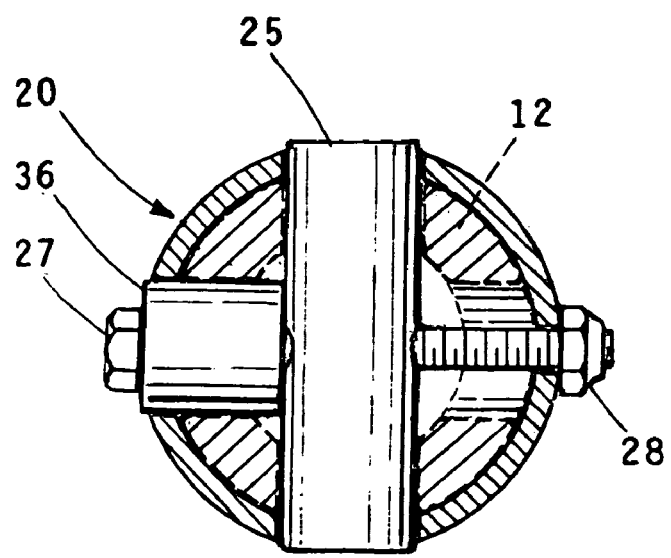
FIG. 7 is a cross sectional view taken along the plane indicated by 7-7 in FIG. 6.

Referring now to FIGS. 3-7, the shaft 12 of the winch 10 has two first pairs of opposing apertures 12a and 12b formed at right angles to each other in the opposing walls thereof. The ratcheting cap section 20 has two pairs of opposing apertures 20a and 20b formed therethrough. The cap section 20 is removably attached to the shaft 12 of the winch by a post 25 which is fitted through apertures 12a and 20a. Post 25 has an aperture 25a formed therethrough. Screw 27 is fitted through sleeve 36 and apertures 25a, and 20c and tightened in place by means of nut 28 as best can be seen in FIGS. 4 and 7. A sleeve 36 is fitted over the end portion of screw 27 in view of the larger aperture 20a formed on this side of cap section 20. This sleeve provides a clamping action to make for a solid attachment of the ratchet cap to the winch.

The second section 30 of the ratcheting cap is attached to the first section 20 of the cap by means of screw 31 which fits through a washer 32 and an aperture in the second section 30 of the ratcheting cap. This screw engages threaded extension 33 of first cap section 20. Protective sleeve 35 which may be of rubber or a suitable plastic is fitted over the ends of sections 20 and 30 to protect the opening between these two sections of the cap to prevent moisture and/or contaminants from entering into the interior of the ratchet mechanism. As shown n FIG. 5, Lever arm 16 for driving the winch is removably installed in aperture 30a formed in cap section 30.

Referring now to FIGS. 6 and 8-10, the face of the inner portion of the cap section 20 has a plurality of recesses 37 circularly running around the outer part thereof. These recesses have portions 37a at one end thereof which run substantially at right angles to the surface of the plate forming the face of section 20. The opposite end portions 37b of each of the recesses are slanted upwardly in the direction of the face surface. Pins 39 having rounded end portions 39a are installed in receptacles 41a formed in cap section 30. A coil spring 40 is installed in each of the receptacles behind the pins and thus urge the pins against the surfaces of the recesses 37. As can be seen in FIG. 9 when the outer cap portion 30 is driven in the direction indicated as "A," the pins will abut against the end of the recess and will be prevented from moving out of the recess. When the outer cap portion 30 is driven in the opposite direction, indicated by "B" in FIG. 10, the pins will slide over the slanted end portion into the next recess.

In this manner, when the lever arm is driven downwardly against the floor with the pins against the vertical end of the recess, the arm can be moved in the opposite direction to bring the pins into an adjacent (or two adjacent recesses) thereby bringing the lever arm off the floor so that additional tightening of the winch can be accomplished without removing the lever arm from its receptacle in the cap.

While the invention has been described and illustrated in detail, this is intended by example only and is not be taken by way of limitation, the spirit and scope of the invention being limited only by the terms of the following claims.

We claim:

1. In a ratcheted winch for tightening a strap to retain an article on a vehicle deck, said winch having a shaft around which the strap is wound in a direction to tighten the strap, a ratcheting cap comprising:
   means for attaching said ratcheting cap to the shaft of the winch;
   a pair of pins mounted in said ratcheting cap in opposing positions;
   a plate having a plurality of recesses arranged in a circular configuration formed therein;
   means for resiliently driving said pins into said recesses in abutment against the inner walls of said recesses;
   said recesses each having one end which prevents the pins from being driven out of the recesses and an opposite end which permits said pins to be driven out of a recess into an adjoining recess; and
   means for driving said pins either towards said one end of said recesses or towards the opposite end of said recesses;
   wherein said ratcheting cap has first and second sections, means for removably attaching said two sections to each other, and means for attaching said first section to said winch shaft;
   including a protective sleeve fitted over the attachment between said first and second sections of said ratcheting cap to prevent moisture and contaminants from entering said ratcheting cap.

2. The device of claim 1 wherein the means for attaching the ratcheting cap to the shaft of said winch comprises: first and second pairs of apertures formed in opposing walls of said ratcheting cap, the apertures of each pair being aligned with each other,
   the first pair of apertures being at right angles to said second pair of apertures, first and second pairs of apertures formed in opposing walls of said winch shaft, the apertures of each pair in said winch shaft being aligned with each other, the first pair of apertures in said winch shaft being at right angles to the second pair of apertures in said winch shaft, a post having an aperture formed therethrough being fitted through the first pairs of apertures in said ratcheting cap and said winch shaft, a screw being fitted through the second pairs of apertures in said ratcheting cap and said winch shaft and the aperture in said post and a nut attached to one end of said screw to retain the post within said winch shaft and said ratcheting cap.

3. The device of claim 1 wherein said plate having said recesses is in said first ratcheting cap section and receptacles formed in said second ratcheting cap section, said pins being mounted in said receptacles.

4. The device of claim 3 wherein said means for resiliently driving said pins comprises coil springs mounted in said receptacles behind said pins.

5. The device of claim 1 wherein said pins have rounded heads.

6. In a winch used for tightening a strap to retain an article on a deck, said winch having a shaft and being employed to drive a ratcheting mechanism in a direction which tightens the strap around the shaft of the winch, the improvement comprising:
   a ratcheting cap having first and second sections said second section having an aperture formed therein;
   a lever fitted into said aperture in said second cap section;
   means for attaching said first cap section to said second cap section;
   means for attaching said first cap section to said winch shaft;
   said first cap section having an outer plate with a plurality of recesses formed therein in a circular configuration;
   said second cap section having a surface directly opposite the outer plate of said first cap section;
   a pair of receptacles formed in said second cap section, said receptacles extending to said surface of said second cap section;
   a pin installed in each of said receptacles; and
   a spring in each of said receptacles urging said pins against the surfaces of said recesses;
   said recesses being shaped so that said pins are prevented from exiting the recess in which it is installed and entering an adjacent recess when said second cap section and said pins are rotated in one direction and permitted to exit the recess in which it is installed and enter an adjacent recess when said second cap section and said pins are rotated in a direction opposite to said one direction;
   whereby when said lever abuts against the deck, said ratcheting cap can be driven in said direction opposite to said one direction by said lever to raise said lever off the floor to permit the lever to drive the ratcheting cap in said second direction to further tighten the strap; and further including a protective sleeve fifed over the attachment between said first and second sections of said ratcheting cap.

7. The device of claim 6 wherein, said recesses of the outer plate of said first cap section each have one end which is substantially at right angles to the surface of said plate and the other end of said recesses being slanted, the slanted ends of said recesses being slanted upwardly.

8. The device of claim 6 wherein the ends of said pins are rounded.

9. The device of claim 6 wherein said means for connecting said first section of said ratcheting cap to said winch shaft includes a first pair of apertures aligned with each in opposing relationship other formed in the opposing walls of said first section of said ratcheting cap, a second pair of apertures aligned with each other in opposing relationship formed in the opposing walls of said first section of said ratcheting cap to substantially at right angles to said first pair of said apertures, a first pair of apertures formed in the opposite walls of said shaft, a second pair of apertures formed in the opposite walls of said shaft substantially at right angles top said first pair of apertures formed in said shaft, said first and second pair of apertures in said shaft being aligned with said first and second pair of apertures in said ratcheting cap, respectively, a post having an aperture formed therethrough fitted through the first pairs of apertures in said first section of said ratcheting cap and said shaft; a screw being fifed through the second pairs of apertures in said first section of said ratcheting cap and said shaft and the aperture in said post, and a nut attached to one of said screw.

10. The device of claim 9 and further including a sleeve fitted between the head of the screw and a side wall of said post, said sleeve being tightened against said post to provide a clamping action.

* * * * *